United States Patent
Arizmendi

(10) Patent No.: US 11,542,761 B2
(45) Date of Patent: Jan. 3, 2023

(54) TAPERED THREAD TUBULAR GRIPPING DEVICE

(71) Applicant: Centergenics, LLC, Magnolia, TX (US)

(72) Inventor: Napoleon Arizmendi, Magnolia, TX (US)

(73) Assignee: Centergenics, LLC, Magnolia, TX (US)

( * ) Notice: Subject to any disclaimer, the term of this patent is extended or adjusted under 35 U.S.C. 154(b) by 0 days.

(21) Appl. No.: 17/402,470

(22) Filed: Aug. 13, 2021

(65) Prior Publication Data
US 2022/0120147 A1    Apr. 21, 2022

Related U.S. Application Data

(60) Provisional application No. 63/065,788, filed on Aug. 14, 2020.

(51) Int. Cl.
| | | |
|---|---|---|
| *F16L 3/12* | (2006.01) | |
| *E21B 19/24* | (2006.01) | |
| *E21B 17/10* | (2006.01) | |

(52) U.S. Cl.
CPC .............. *E21B 19/24* (2013.01); *E21B 17/10* (2013.01); *F16L 3/1211* (2013.01)

(58) Field of Classification Search
CPC ...... E21B 19/24; E21B 17/1078; E21B 17/10; E21B 37/02; F16L 3/1211; Y10T 403/7058
See application file for complete search history.

(56) References Cited

U.S. PATENT DOCUMENTS

| | | | | |
|---|---|---|---|---|
| 3,600,010 | A * | 8/1971 | Downs, III | F16L 37/0925 285/321 |
| 4,600,063 | A * | 7/1986 | Beasley | F16D 1/05 175/325.5 |
| 5,706,894 | A * | 1/1998 | Hawkins, III | E21B 17/10 166/208 |
| 6,986,533 | B2 * | 1/2006 | Ko | F16L 37/0925 285/317 |
| 10,487,622 | B2 * | 11/2019 | Nickles | E21B 34/102 |
| 2019/0119997 | A1 * | 4/2019 | Helms | E21B 19/164 |
| 2021/0301627 | A1 * | 9/2021 | Morrison | E21B 17/1014 |

* cited by examiner

*Primary Examiner* — Yong-Suk (Philip) Ro

(57) ABSTRACT

A wellbore casing self-tightening tubular gripping device.

20 Claims, 10 Drawing Sheets

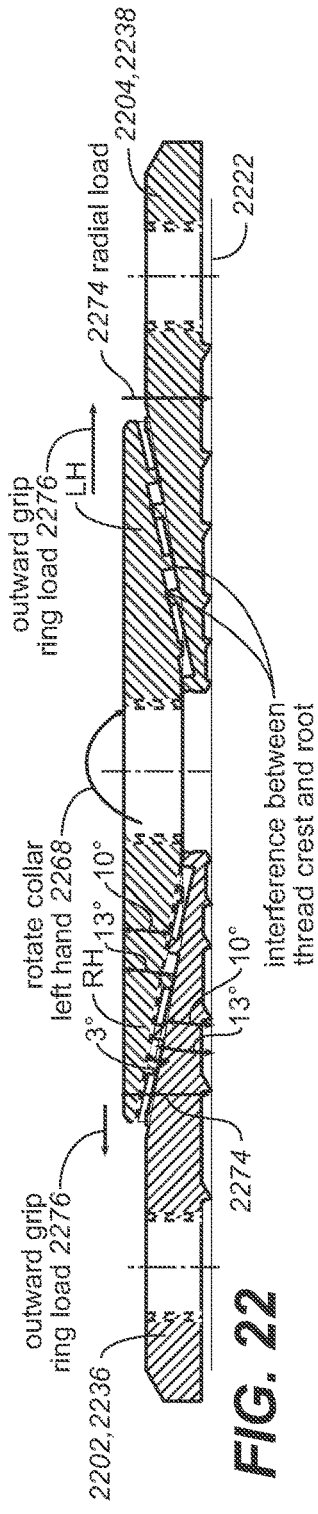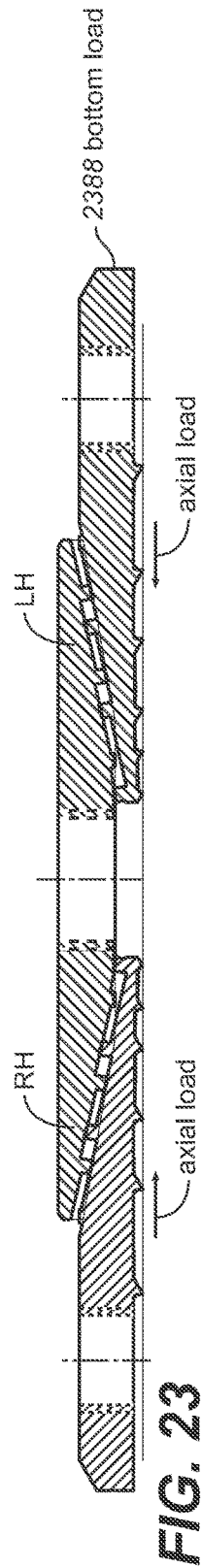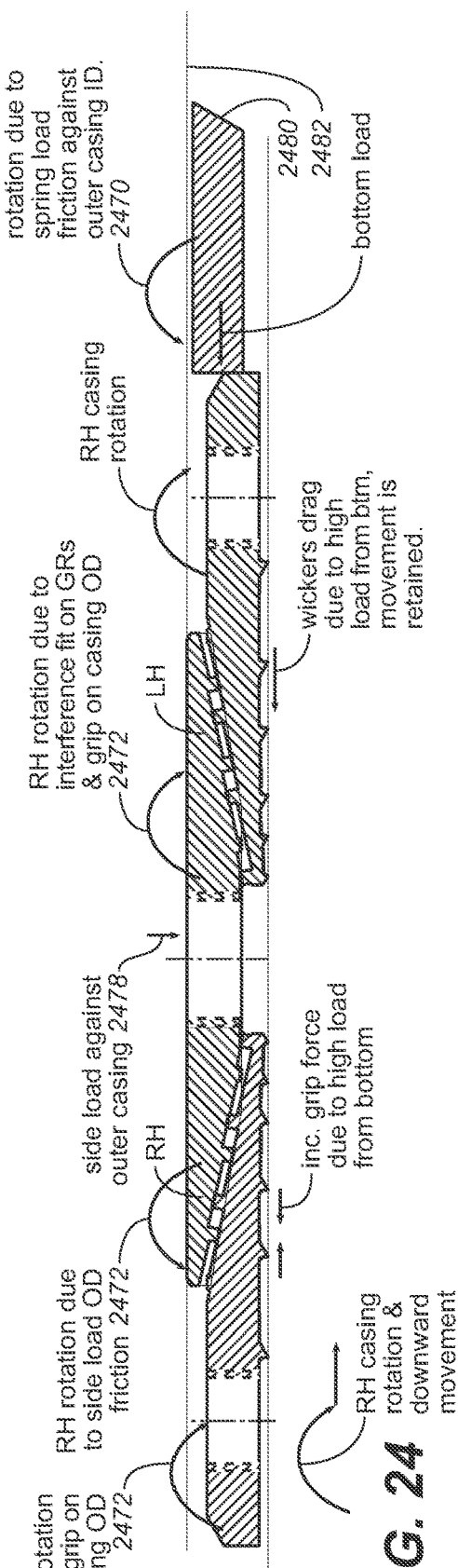
FIG. 22
FIG. 23
FIG. 24

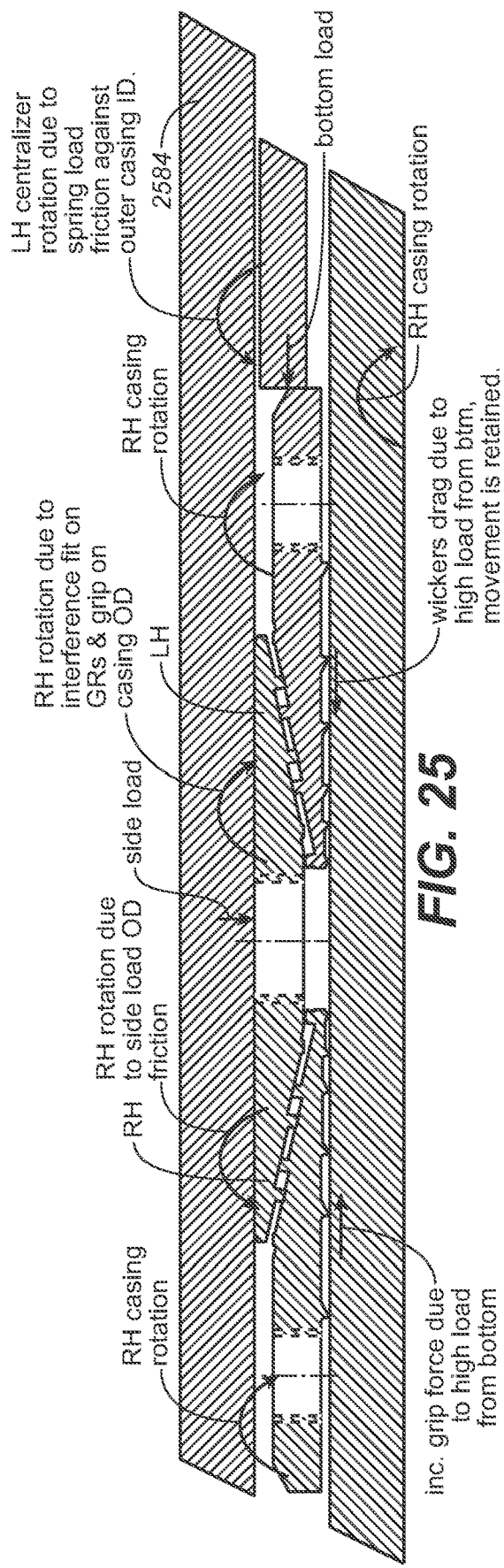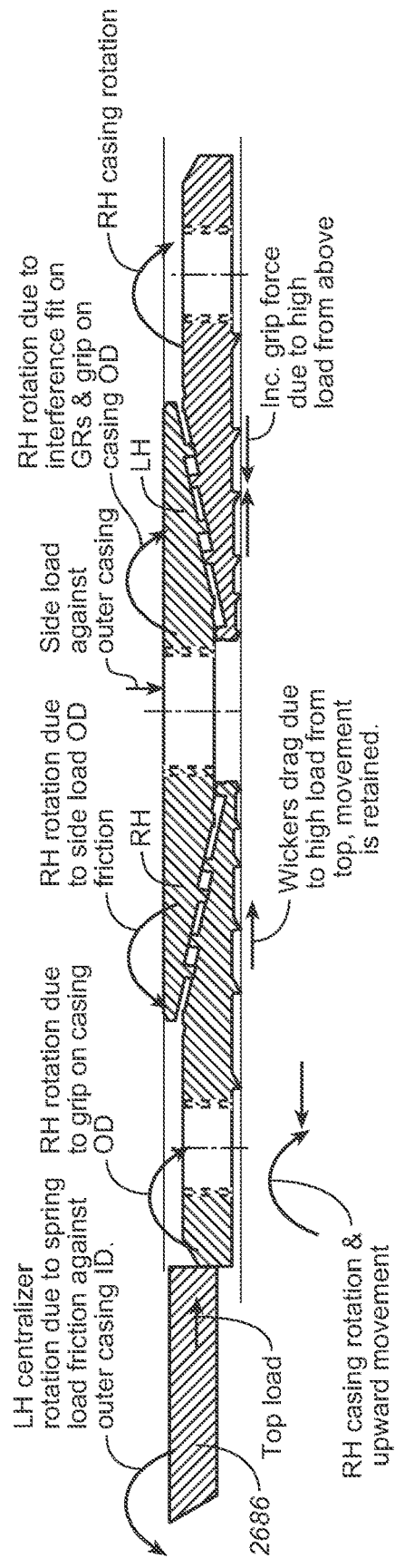

TAPERED THREAD TUBULAR GRIPPING DEVICE

TECHNICAL FIELD

Embodiments described are related to wellbore casing self-tightening tubular gripping device. Accordingly, while the invention is described in terms of a down-hole casing stop collar, it is not limited to this application.

BACKGROUND

Within the area of subterranean well construction, centralizers are used to keep the tubular casing centered in the wellbore to facilitate placement of the casing in the bore and to prevent cementing the pipe against a side of the borehole. Centralizers isolate the outer surface of the wellbore pipe from the inner surface of the wellbore. Additionally, in long horizontal sections of wellbore, centralizers provide support of the tubular casing section, preventing the wellbore pipe from laying on the lower inner surface of the horizontal wellbore. In some instances, a centralizer is configured to grip a tubular casing. In some instances, a gripping stop collar may be affixed around a tubular casing. For example, in situations where a non-gripping centralizer is employed, the non-gripping centralizer may be used in conjunction with a stop/lock collar which grips the tubular casing and may interface with the non-gripping centralizer to constrain linear and axial movement of the centralizer with respect to the tubular casing.

The embodiments described are focused on providing improved functionality for a gripping mechanism and devices suitable for use as a down-hole casing stop collar to be used in conjunction with a down-hole casing centralizer, or alternatively incorporated into a down-hole casing centralizer assembly. The utility the "Tapered Thread Gripping" mechanism described herein may be extended to many other applications where it its desired to assemble a stopping shoulder or facilitate a mechanical connection on to any part that might incorporate a section with a cylindrical surface, for example any tubular pipe or solid rod.

BRIEF DESCRIPTION OF THE DRAWINGS

The accompanying drawings, which are incorporated in and form a part of this specification, illustrate various embodiments and, together with the Description of Embodiments, serve to explain principles discussed below. The drawings referred to in this brief description of the drawing should not be understood as being drawn to scale unless specifically noted.

FIG. 17 is a cross sectional view of grip ring and collar in an intermediate loaded position.

FIG. 22 is a cross sectional view of bidirectional tapered thread tubular gripping device with two grip rings, one collar, and mismatched tapered threads under left hand rotation.

FIG. 23 is a cross sectional view of bidirectional tapered thread tubular gripping device with two grip rings, one collar, and mismatched tapered threads under a bottom axial load.

FIG. 24 is a cross sectional view of bidirectional tapered thread tubular gripping device with two grip rings, one collar, and mismatched tapered threads under a bottom axial load with the friction forces visible.

FIG. 25 is a cross sectional view of bidirectional tapered thread tubular gripping device with two grip rings, one collar, and mismatched tapered threads under a bottom axial load within a wellbore.

FIG. 26 is a cross sectional view of bidirectional tapered thread tubular gripping device with two grip rings, one collar, and mismatched tapered threads under a top axial load.

DETAILED DESCRIPTION

Reference will now be made in detail to embodiments of the subject matter, examples of which are illustrated in the accompanying drawings. While the subject matter discussed herein will be described in conjunction with various embodiments, it will be understood that they are not intended to limit the subject matter to these embodiments. On the contrary, the presented embodiments are intended to cover alternatives, modifications and equivalents, which may be included within the spirit and scope of the invention as defined by the appended claims. Furthermore, in the Detailed Description, numerous specific details are set forth in order to provide a thorough understanding of embodiments of the present subject matter. However, embodiments may be practiced without these specific details. In other instances, well known methods, procedures, and components have not been described in detail as not to unnecessarily obscure aspects of the described embodiments.

Notation and Nomenclature

Any use of "top," "bottom," "above," "below," other directional terms, and variations of these terms is made for convenience, but does not require any particular orientation of the components. The terms "helical" and "spiral" are not intended to require perfectly mathematical helix or spirals, and are also particularly intended to include square ended, closed ended, and ground versions of springs of these types, various screw thread forms, and also as the channels that would receive any of these shapes.

Embodiments described herein relate to a tubular gripping device that can be disposed about and can grip to a tubular wellbore pipe, such as for example a well casing or tubing, within a wellbore. The tubular gripping device may comprise a centralizer, a lock collar, or the like. In one embodiment, the tubular gripping device described herein attaches to an outside surface of a tubular well pipe section. Conventional attachment procedures for a tubular gripping device involve installing locking pins, tightening a retaining device or other conventional practices that requires an externally applied force at the time of installation, such as for example pounding with a hammer or tightening a screw, to lock the tubular gripping device to a pipe section or drive a securing pin into a pipe section. Embodiments described herein do not require an externally applied force at the time of installation to secure the tubular gripping device to a pipe segment, as with conventional tubular gripping devices.

Figure 1:
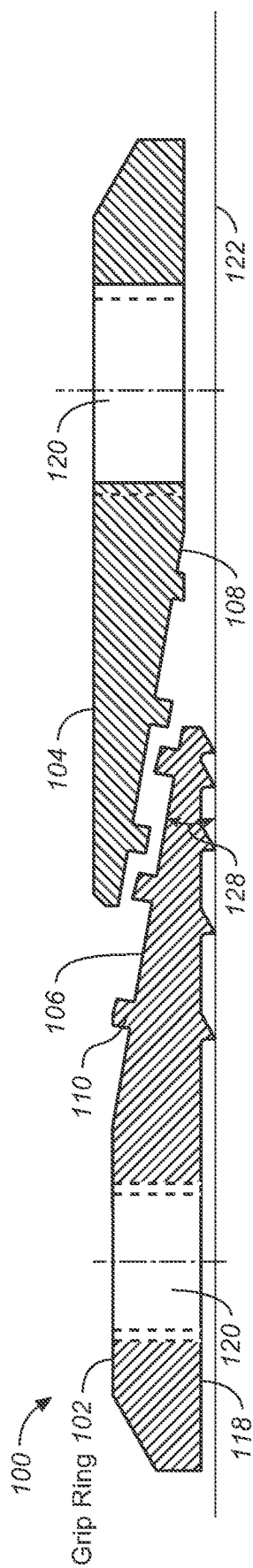
FIG. 1 is a cross sectional view of an embodiment of a unidirectional tapered thread tubular gripping device illustrated in accordance with the principles of the present invention described herein.

FIG. 1 is a cross sectional view of an embodiment of a unidirectional tapered thread tubular gripping device 100 illustrated in accordance with the principles of the present invention described herein. Unidirectional tapered thread tubular gripping device 100 is self-tightening and has a generally cylindrical body with a hollow interior. Unidirectional tapered thread tubular gripping device 100 has a grip ring 102 and a collar 104. On the outer surface of grip ring 102 there is grip ring make-up surface 106. On the inner surface of collar 104 there is collar make-up surface 108. On grip ring make-up surface 106 there are male threads 110, and on collar make-up surface 108 there are female threads 112. Threads 110 and 112 are of a generally square profile. The threaded portion of grip ring 102 and collar 104 is on an incline of a specified angle α 114. Grip ring 102 has biased wickers 116 on an interior surface 118. In this embodiment grip ring 102 and collar 104 have apertures 120 suitable for tools. Grip ring 102 and collar 104 can be placed over the surface of casing 122.

Figure 2:
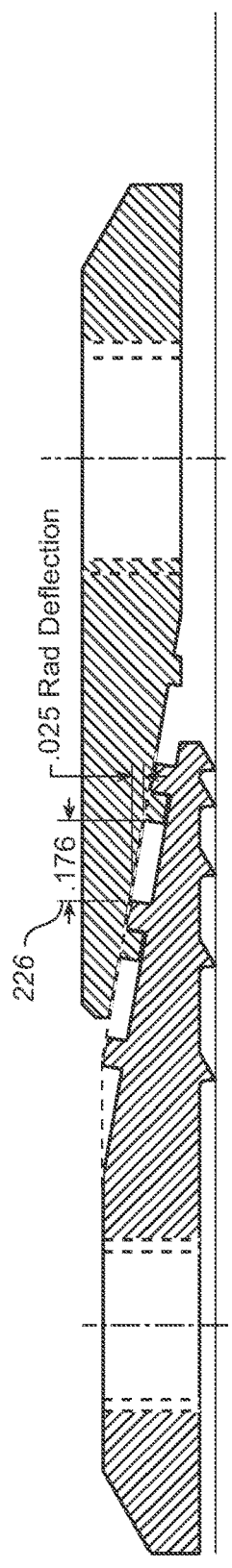
FIG. 2 is a cross sectional view of the unidirectional tapered thread tubular gripping device of FIG. 1 in an engaged position.
Figure 3:
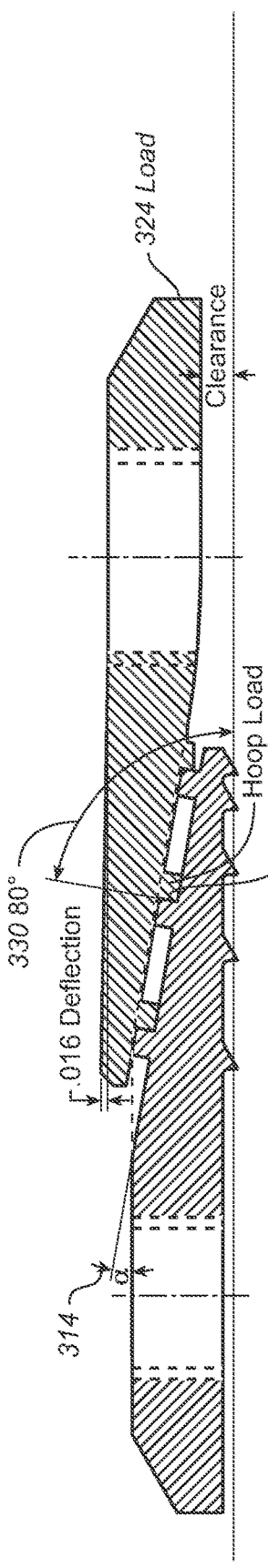
FIG. 3 is a cross sectional view of the unidirectional tapered thread tubular gripping device of FIG. 1 energized under an external axial load

FIG. 2 is a cross sectional view of the unidirectional tapered thread tubular gripping device 100 of FIG. 1 with grip ring 102 and collar 104 in an engaged position FIG. 3 is a cross sectional view of the unidirectional tapered thread tubular gripping device 100 of FIG. 1 energized under an external axial load 324.

Referring to FIG. 1-3, with grip ring 102 and collar 104 placed over the outer diameter of casing 122, biased wickers 116 act to resist movement of grip ring 102 from external applied loads 324 from collar 104. Collar 104 can experience said external applied loads 324, and transfers external applied load 324 to grip ring 102, energizing grip ring 102.

Grip ring 102 can be pre-energized with minimal torque, for instance by hand or using tools.

Make-up surfaces 106 and 108 have a tapered thread profile with a pitch of 3.3 TPI. Threads 110 and 112 are approximately 20% of the alternate make-up surface thread root profile. At this specification there is an approximate 0.176" gap 226 allowing for additional relative axial movement between grip ring 102 and collar 104 in response to external axial load 324. As a result of gap 226, as increased external axial loads 324 are applied to collar 104, grip ring 102 will continue to energize into casing 122 as gap 226 is forced to be smaller. Through the wedging action of the thread crests engaging the thread roots along the ramp angle α 314.

To set up the unidirectional tapered thread tubular gripping device 100, grip ring 102 and collar 104 are first put in the engaged position. Collar 104 is then rotated in the right hand direction which energizes grip ring 102. Further rotation of collar 104 will then engage the threads 110 and 112, resulting in right hand flank of collar's female thread 112 loading against left hand flank of grip ring's male thread 110. In this embodiment, the incline of a specified angle α 314 is a 10° angle, or 10° ramp 128. Said 10° ramp 128 combined with the thread helix and a minimal amount of right hand torque (hand tight) will generate sufficient radial load into grip ring 102 to cause it to grip casing 122 and withstand light axially applied loads. The contact between the right hand flank of collar's female thread 112 loading against left hand flank of grip ring's male thread 110 will be considered a form of secondary contact, with biased wickers 116 and casing 122 being the primary contact.

This initial radial load resulting from hand tightening is typically several times greater than what can be obtained from the internal stresses developed by previous methods such as expanding a c-ring of similar cylindrical geometry that is initially a smaller diameter than casing 122. Increasingly higher applied external axial loads 324 will cause collar 104 to deflect outward slightly, but will mainly move axially which will further engage ramp 128 and energize the system. Referencing FIG. 3, external axial load 324 can be seen to act in the direction that would push collar 104 towards grip ring 102.

The increased engagement of 10° ramp 128 increases the radial grip force on casing 122 via deflection of grip ring 102 until secondary contact between the left hand flank of the collar's female thread 112 and the right hand flank of the grip ring's male thread 110 profile occurs. Once the thread flanks are forced to engage, 10° ramp 128 causes radial compression of the parts and additional radial gripping is effectively eliminated. At this point further wedging action and energization is not required in order to sustain resistance to increasing external applied loads 324 as the primary contact of biased wickers 116 are already significantly penetrated into casing 122, wherein system resistance to additional slipping is primarily governed by the material strength of casing 122.

In this embodiment, the provided secondary contact through the thread flanks is at 80° angle 330 to the rings axis. The thread flanks 80° angle 330 creates a reverse wedging bias of 10° from the normal to the ring's axis, which assists in keeping the rings together and prevents collar 104 from slipping over grip ring 102 under extreme axial external applied loads 342.

Figure 4:
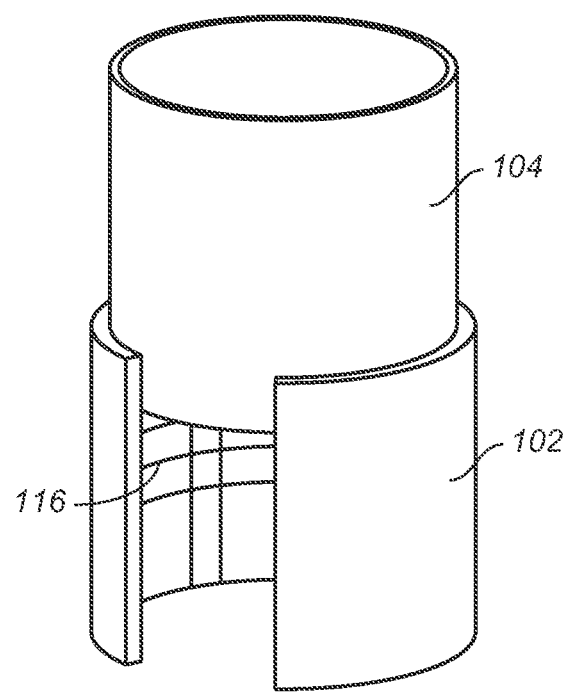
FIG. 4 is an isometric view of unidirectional tubular gripping mechanism.

FIG. 4 is an isometric view of unidirectional tapered thread tubular gripping device 100 illustrated in accordance with the principles of the present invention described herein. In this embodiment, grip ring 102 is in the shape of a C-ring. Collar 104 is generally solid while grip ring 102 may benefit by being biased to minimize its resistance to radial deflection or to facilitate an initial engagement with casing 122. This bias may be obtained by providing grip ring 102 in the form of a C-ring or including longitudinal slots (not shown) through certain sections of grip ring 102 (for example in sections containing wickers).

Figure 5:
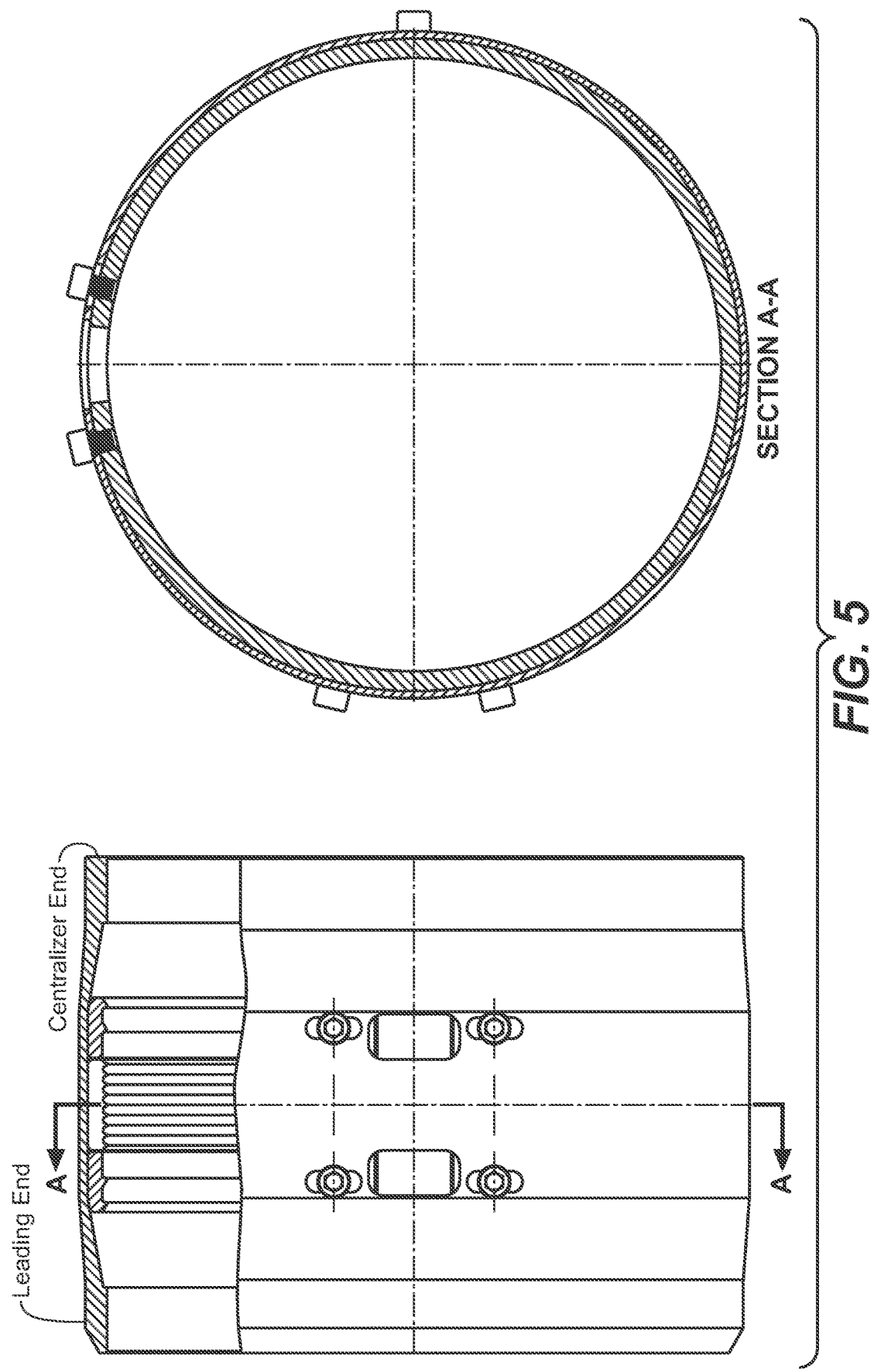
FIG. 5 is a cross sectional and overhead view of a stop collar assembly according to U.S. patent application Ser. No. 15/800,671.

FIG. 5 is a cross sectional and overhead view of a stop collar assembly according to U.S. patent application Ser. No. 15/800,671. The secondary contact through the thread flank acts in a functionally equivalent manner to the secondary load shoulder described in Centergenics' U.S. patent application Ser. No. 15/800,671. One benefit of the current invention when compared to the designs described in application Ser. No. 15/800,671 is that the distance of travel and resulting deformation from the initially installed position until the secondary contact of the thread flank occurs is constant regardless of the casing's actual outer diameter, yielding predictable performance whereas the degree of travel and deformation until the secondary load shoulder is activated in the designs disclosed in Ser. No. 15/800,671 vary in accordance with the casing outer diameter tolerances.

The holding capacity of any wedge-based locking system such as the current invention is generally enhanced by maximizing the area of contact between wedge elements and providing the thickest possible sections through parts which are stressed by reactive loads. U.S. patent application Ser. No. 15/800,671 has imposed system constraints that effect any design, such as provided for clearance between the stop collar components of solid construction and the casing to which it will be mounted. The casing outer diameter is allowed to vary from its nominal value within tolerance levels, creating a range of outer diameter dimensions over which a stop collar such as Ser. No. 15/800,671 must function. Typically, casing outer diameter is obtained with tolerances defined in an API specification that are nominal +1.0% on the maximum and nominal −0.5% for the minimum.

Figure 6:
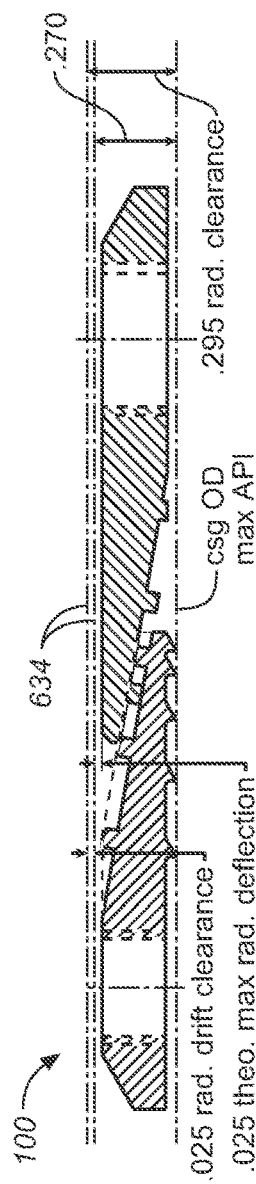
FIG. 6 is a cross sectional view of unidirectional tapered thread tubular gripping device on a casing of maximum size tolerance.

FIG. 6 is a cross sectional view of unidirectional tapered thread tubular gripping device 100 on a casing 122 of maximum size tolerance illustrated in accordance with the principles of the present invention described herein. In addition to the parts outlined for FIG. 1-3, FIG. 6 refers to components such as the length of the thread root gap 226, and the relationship of maximum permitted grip ring 102 and collar 104 thicknesses which is shown with the dotted lines 634.

In regards to the current invention, a stop collar assembly incorporating a tapered thread gripping mechanism and wherein grip ring 102 is formed as a C-ring, it can be shown that for a given stop collar system outer diameter this arrangement provides for the maximum effective ramp area contact and maximum thickness possible for the stress retaining member, collar 104. When comparing FIG. 6 with that of FIG. 5 as disclosed in U.S. patent application Ser. No. 15/800,671, it can be seen that since less layers are required in the current invention that much larger inner diameters are possible than in U.S. patent application Ser. No. 15/800,671

Furthermore, when a tapered thread tubular gripping device is fully installed on casing 122 then the additional energization, axial movement, and deflections resulting from additional external applied loads (such as those in FIG. 3) is defined by the length of the thread root gap 226 which is exactly the same regardless of the tolerance of casing 122 on which the system is installed.

Figure 7:
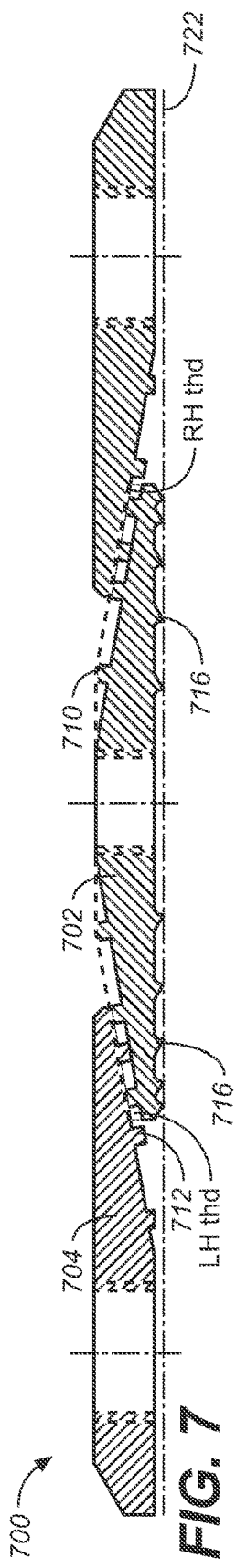
FIG. 7 is a cross sectional view of a bidirectional tapered thread tubular gripping device with one grip ring and two collars.

FIG. 7 is a cross sectional view of a bidirectional tapered thread tubular gripping device 700 with one grip ring 702 and two collars 704 illustrated in accordance with the principles of the present invention described herein.

In this embodiment, grip ring 702 has biased wickers 716 on interior surface 718. On an outer surface of grip ring 702, there is grip ring make-up surface 706, and there is collars' make-up surface 708 on the inner surface of collar 704. On grip ring make-up surface 706 there are male threads 710, and on the collars' make-up surfaces there are female threads 712. Threads 710 and 712 are of a generally square profile. The threaded portions of grip ring 702 and collar 704 are on an incline of a specified angle, or wedge shape, a 714. In this embodiment grip ring 702 and collar 704 have apertures 720 suitable for tools. Grip ring 702 and collar 704 can be placed over the surface of casing 722.

This embodiment is self-tightening and consists of two collars 704 flanking a single grip ring 702 that will withstand external axial loads (such as external axial load 324 from FIG. 3) from two directions when such loads are applied to the assembly through the outward facing ends of collars 704. The tapered threads on opposite sides of grip ring 702 are shown to be of right hand and left hand orientation to prevent rotational back-off of the threads due to rotational drag of collars 704 against the wellbore walls as casing 722 is rotated to the right while being lowered into the wellbore. In this depiction, the right-hand side is considered the down hole direction, but it should be appreciated that the assembly is bi-directional.

Figure 8:
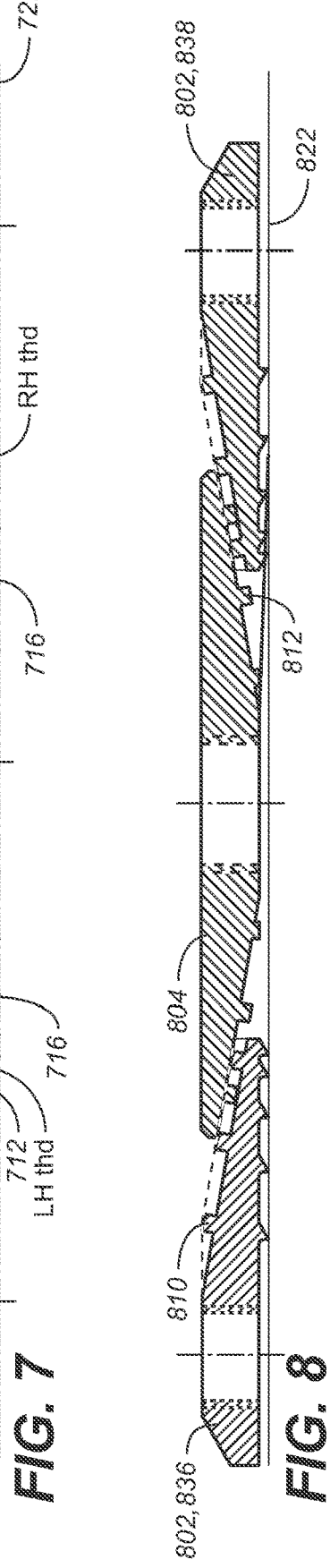
FIG. 8 is a cross sectional view of a bidirectional tapered thread tubular gripping device with two grip rings and one collar in a first situation.

FIG. 8 is a cross sectional view of a bidirectional tapered thread tubular gripping device 800 with two grip rings 802 and one collar 804 in a first situation of a casing 822 having outer diameter at the maximum allowable tolerance illustrated in accordance with the principles of the present invention described herein.

Bidirectional tapered thread tubular gripping device 800 is self-tightening and has an upper grip ring 836 and a lower grip ring 838. In this embodiment, grip rings 802 have biased wickers 816 on interior surface 818. On an outer surface of grip rings 802 there is a grip ring make-up surface 806, and there is collar make-up surface 808 on inner surface of collar 804. On grip rings' make-up surfaces 806 there are male threads 810, and on collar make-up surface 808 there are female threads 812. Threads 810 and 812 are of a generally square profile. The threaded portions of grip rings 802 and collar 804 are on an incline of a specified angle α 814. In this embodiment grip rings 802 and collar 804 have apertures 820 suitable for tools. Grip rings 802 and collar 804 can be placed over the surface of casing 822.

Figure 9:
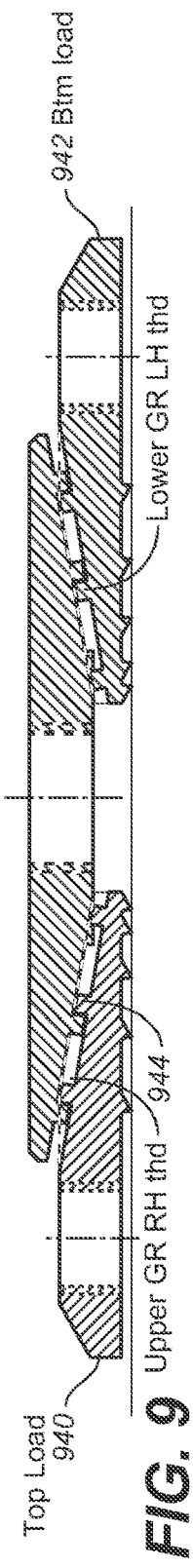
FIG. 9 is a cross sectional view of a bidirectional tapered thread tubular gripping device with two grip rings and one collar in a first situation.

FIG. 9 is a cross sectional view of a bidirectional tapered thread tubular gripping device 800 with two grip rings 802 and one collar 804 of FIG. 8 in a second situation of casing 822 having outer diameter at the minimum allowable tolerance. In addition to the components of FIG. 8, FIG. 9 shows upper grip ring 836 experiencing a top external load 940, and lower grip ring 838 experiencing a bottom external load 942. Top external load 940 and bottom external load 942 are axial loads. As this is a bidirectional tapered thread tubular gripping device 800, it should be appreciated that either end can be considered top or bottom.

Referring to FIGS. 8 and 9, in this embodiment of a bidirectional tapered thread tubular gripping device 800, the singular collar 804 is flanked by two grip rings 802, where upper grip ring 836 is envisioned as being on the up-hole side and lower grip ring 838 on the down hole side. Upper grip ring 836 has a right hand outer tapered thread profile, and the lower grip ring 838 has a left hand outer thread profile. The center collar 804 is one piece with right hand and left hand box tapered thread profiles on opposite ends and will thus require to be made up with both grip rings 802 simultaneously.

In the first situation of FIG. 8 the assembly is positioned for installation on a casing 822 with an outer diameter of the maximum tolerance, where all the threads are in position but not yet made up. As collar 804 is turned during make-up, grip rings 802 will be pulled axially toward each other by the make-up of the tapered thread until hand tight (approximately 40 ft-lbs). During this process of relative movement, one or both of grip rings 802 will be required to skid along the surface of casing 822. The grip rings' 802 wickers 816 are biased to facilitate this skidding action in the direction of movement toward the center of the assembly while conversely preventing skidding in the other direction.

In the second situation of FIG. 9 the assembly is fully installed on casing 822 with an outer diameter of the minimum tolerance and with the tapered thread made-up until hand tight. The torque from hand tightening or tightening with hand tools is sufficient to initiate a grip on casing 822 so that when an external axial load such as 940 or 942 is applied, the assembly will self-energize and prevent any relative axial movement. Bottom external load 942 will be applied to lower grip ring 838, transmitted through 10° ramp 828 on collar 804 until the force reaches approximately 20 kip. After this point the thread is loaded on the other 80° angle thread flank (referred to as the stop shoulder 944).

FIG. 10-13 show the installation process of a bidirectional tapered thread tubular gripping device 800.

Figure 10:
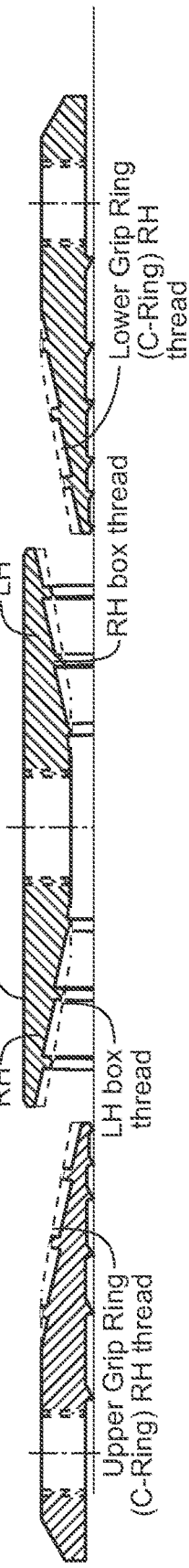
FIG. 10 is a cross sectional view of a bidirectional tapered thread tubular gripping device with two grip rings and one collar in a second installation position.

FIG. 10 is a cross sectional view of a bidirectional tapered thread tubular gripping device 800 with two grip rings 802 and one collar 804 in a first installation position illustrated in accordance with the principles of the present invention described herein.

Grip rings 802 and collar 804 are first positioned onto casing 822. In this embodiment grip rings 802 takes the shape of a c-ring with an inner diameter that is smaller than the outer diameter of casing 822, such that a tool can be used to hold grip rings 802 in an expanded state that allows grip rings 802 to slide onto casing 822. Examples of such tools include spreader pliers or a wrench.

In another embodiment, a disposable or reusable custom sized spacer type fixture may be utilized to hold grip rings 802 in the expanded state which can be quickly removed once grip rings 802 are axially positioned.

After placing collar 804 and grip rings 802 onto casing 822, grip rings 802 would be rotated to align the starting leads of grip rings male threads 810. Grip rings 802 may include reference indicators that are timed to align with the thread starting points to assist in efficient alignment of the thread starting leads.

Figure 11:
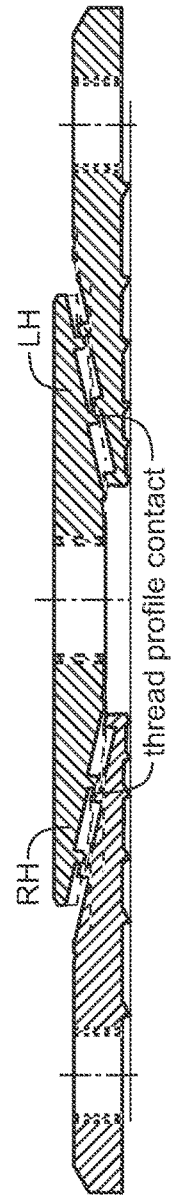
FIG. 11 is a cross sectional view of a bidirectional tapered thread tubular gripping device with two grip rings and one collar in a third installation position.

FIG. 11 is a cross sectional view of a bidirectional tapered thread tubular gripping device 800 with two grip rings 802 and one collar 804 of FIG. 10 in a second installation position.

FIG. 11 shows grip rings 802 after sliding them together until grip ring male threads 810 make contact with collar female threads 812. During this movement, collar 804 should remain concentric to casing 822 and grip rings 802, and collar thread leads should be aligned before applying a right hand rotation to collar 804.

Figure 12:
FIG. 12 is a cross sectional view of a bidirectional tapered thread tubular gripping device with two grip rings and one collar in a fourth installation position.

FIG. 12 is a cross sectional view of a bidirectional tapered thread tubular gripping device 800 with two grip rings 802 and one collar 804 of FIG. 10 in a third installation position.

FIG. 12 shows where the grip rings 802 should be sufficiently rotationally locked to the surface of casing 822 and be pulled inwardly toward each other due to collar female threads 812 contact with grip ring male threads 810.

Figure 13:
FIG. 13 is a close up cross sectional view of grip ring and collar thread profiles.

FIG. 13 is a cross sectional view of a bidirectional tapered thread tubular gripping device 800 with two grip rings 802 and one collar 804 of FIG. 10 in a fourth installation position.

As the final part of the installation process, FIG. 13 has the make-up of collar 804 hand tight at a minimum of approximately 40 ft-lbs which will energize grip rings 802 radially onto the surface of casing 822 as a reaction to the tapered thread helix.

Figure 14:
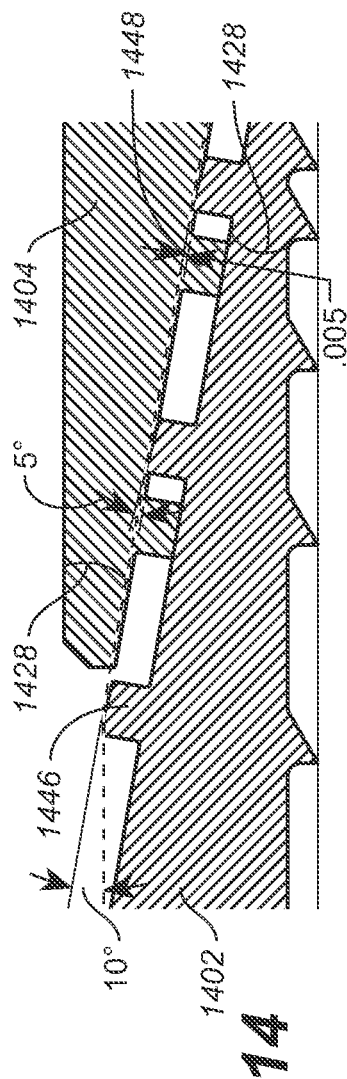
FIG. 14 is a close up axial cross sectional view of the grip ring thread profile.
Figure 15:
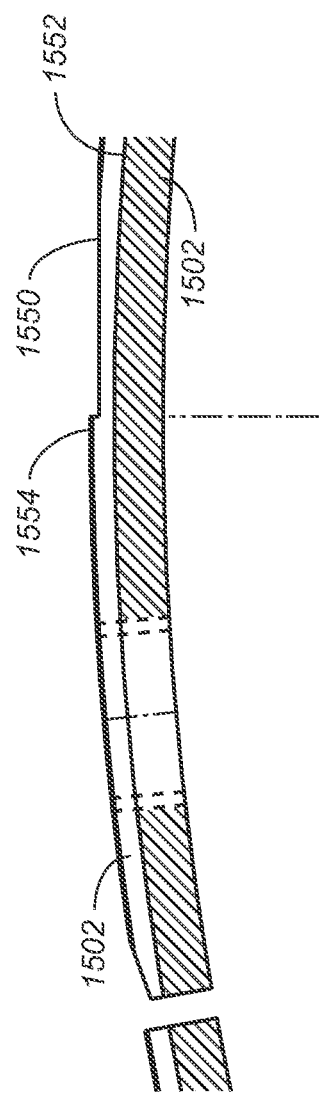

FIGS. 14 and 15 show methods to address potential back-off due to reverse loading at collar 1404 and left hand rotation by providing a resistance to reverse rotation.

FIG. 14 is a close up cross sectional view of grip ring 1402 and collar 1404 thread profiles illustrated in accordance with the principles of the present invention described herein.

In FIG. 14, a carburized or otherwise hardened grip ring male thread 1446 is shown to be approximately 0.005" taller than collar box thread, or collar female thread 1448, and male grip ring thread 1446 also has a 5° angle along the pin thread crest to create a sharp point (circumferential helical line) that grabs the softer collar 1404 inner diameter ramp 1428. Collar 1404 will slide up the pin thread crest of grip ring male thread 1446 along 10° ramp 1428 and lock at that position. Collar 1404 is of a softer material than carburized or otherwise hardened grip ring male thread 1446 and will deform over the carburized pin thread crest of grip ring 1402.

FIG. 15 is a close up axial cross sectional view of the grip ring 1502 thread profile illustrated in accordance with the principles of the present invention described herein. While not shown, it should be understood that the thread profile of the collar is of similar structure.

FIG. 15 shows a right hand grip ring male thread 1546 crest which has a milled flat 1550 that blends to outer diameter 1552 on the right and has a square shoulder 1554 on the left to prevent left hand rotation. The amount of rotational back-off resistance may depend on how much collar 1504 has been pre-energized from either torque or axial loading. With both loading methods there will be a threshold limit of torque which can be resisted, above which the parts will be permitted to rotate.

Once in service it is apparent that applied torque to any of the components which tend to induce relative rotation of made-up parts in the same direction that occurs in the thread make-up for installation will then tighten the system, resulting in further increasing the gripping action against casing 1522 beyond the loads previously obtained by hand tightening. Induced relative rotation in the opposite direction to that of installation thread make-up (in other words in the back-off direction) must be considered to ensure that the system does not become disengaged or otherwise loosen its grip on casing 1522.

Now using the embodiment of a bidirectional tapered thread tubular gripping device 1500 with two grip rings 1502 and one collar 1504 (as seen in at least FIG. 8), once grip rings 1502 and collar 1504 are set in place or at any further energized position (such as FIGS. 12 and 13), then in order for grip rings 1502 to separate a certain amount of axial relative outward movement between grip rings 1502 is required.

Figure 16:
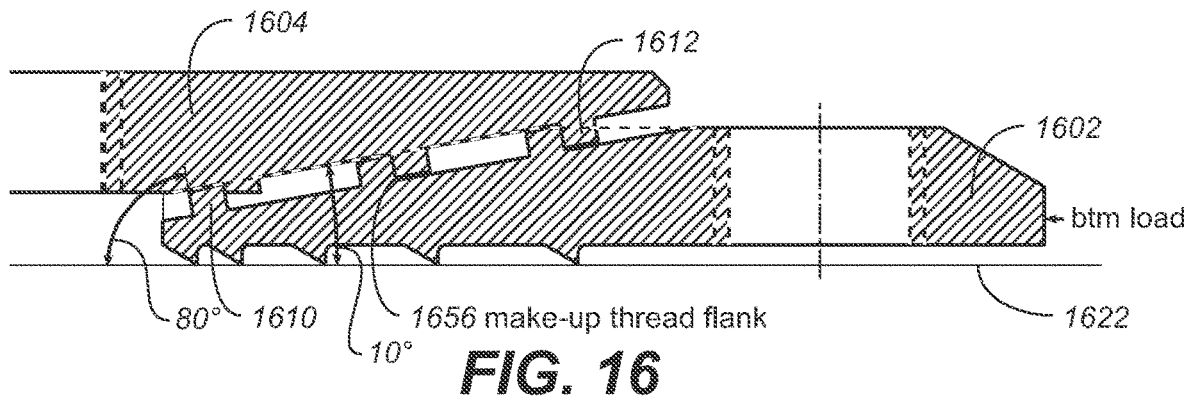
FIG. 16 is a cross sectional view of grip ring and collar with fully engaged threads.

FIG. 16 is a cross sectional view of grip ring 1602 and collar 1604 with fully engaged threads illustrated in accordance with the principles of the present invention described herein. In this view, grip ring 1602 has grip ring male thread 1610 that exist on a 10° ramp 1628 on outer surface of grip ring 1602. Collar 1604 has a collar female thread 1612, existing on a 10° ramp 1628 on inner surface of collar 1604. Grip ring male thread 1610 and female collar thread 1612 have a make-up thread flank 1656. Grip ring 1602 also has biased wickers 1616 on grip rings interior surface 1618.

Once in the set position of fully engaged threads (i.e. grip ring male thread 1610 and collar female thread 1612 in contact at make-up thread flank 1656), if a reversing torque opposite in direction to the installation torque direction is applied to collar 1604, collar 1604 will only rotate if the friction force present between the male and female thread crests and 10° ramp 1628 angle is overcome.

Figure 17:
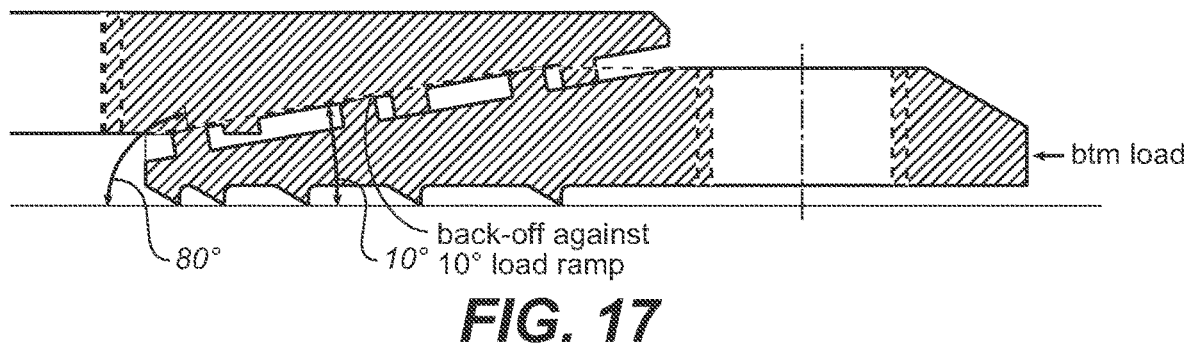
FIG. 17 is a cross sectional view of a bidirectional tapered thread tubular gripping device with two grip rings and one collar in a first installation position.

FIG. 17 is a cross sectional view of grip ring 1602 and collar 1604 from FIG. 16 in an intermediate loaded position.

The intermediate loaded position of FIG. 17 is a result of the friction force present between thread crests and 10° ramp 1628 angle being overcome. At this point continued torque will cause collar 1604 to rotate against the friction force on the 10° ramp 1628 as it will be assumed that the penetration of biased wickers 1616 into the surface of casing 1622 is sufficient to also resist rotation of grip ring 1602 on casing 1622.

Figure 18:
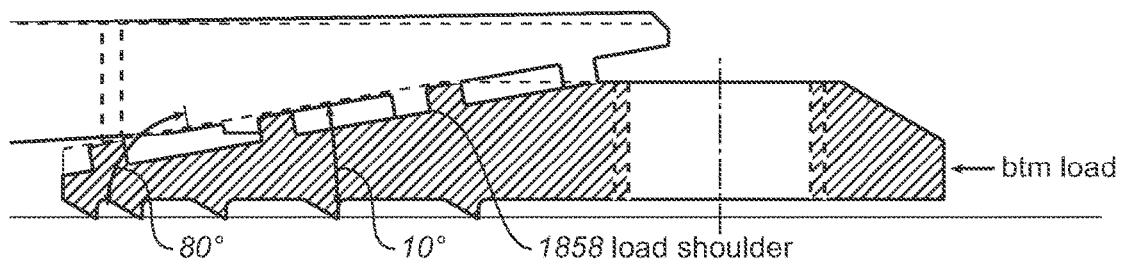
FIG. 18 is a cross sectional view of grip ring and collar in a final loaded position.

FIG. 18 is a cross sectional view of grip ring 1602 and collar 1604 from FIG. 16 in a final loaded position.

Continued rotation past the state of FIG. 17 will cause the opposite thread flanks to engage and lead to the state of FIG. 18, where grip ring male thread 1610 and collar female thread 1612 move to have a load shoulder 1858.

At this point, continued torque will tend to drive grip ring 1602 in the outward axial direction (in other words away from collar 1604), but biased wickers 1616 will act to prevent such movement. The value at which biased wickers 1616 will lose their grip in this scenario depends on the amount of energization force that is trapped in the system. As previously mentioned, the force within the system is not inordinately high after the step of hand tightening. Such deficiency is overcome by a mismatched tapered thread feature which will be described shortly with FIG. 19-21.

Common methods of anti-back-off mechanisms include using set screws or locking compounds, but such methods would be incompatible with the desirable feature of allowing relative axial part motion to occur as a means of further energizing biased wickers 1616 in reaction to large externally applied axial loads. Incorporation of slots and keyways might be functionally compatible, but would be overly complicated to incorporate.

Figure 19:
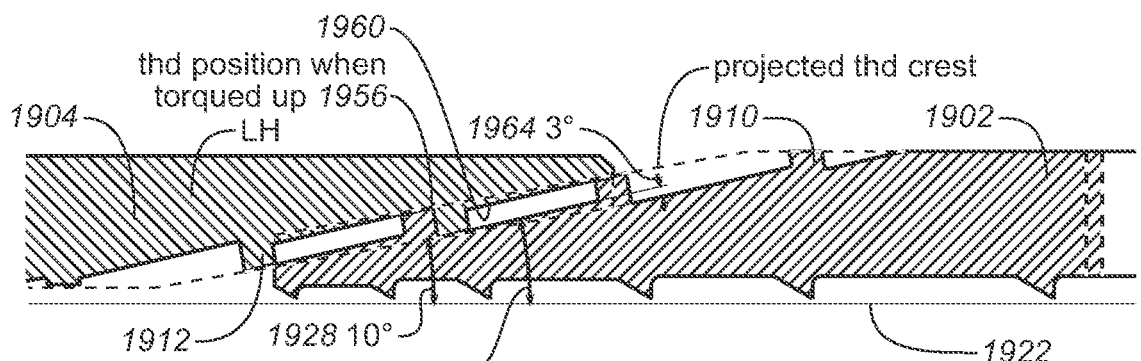
FIG. 19 is a cross sectional view of grip ring and collar with mismatched tapered threads in a full make-up position.
Figure 20:
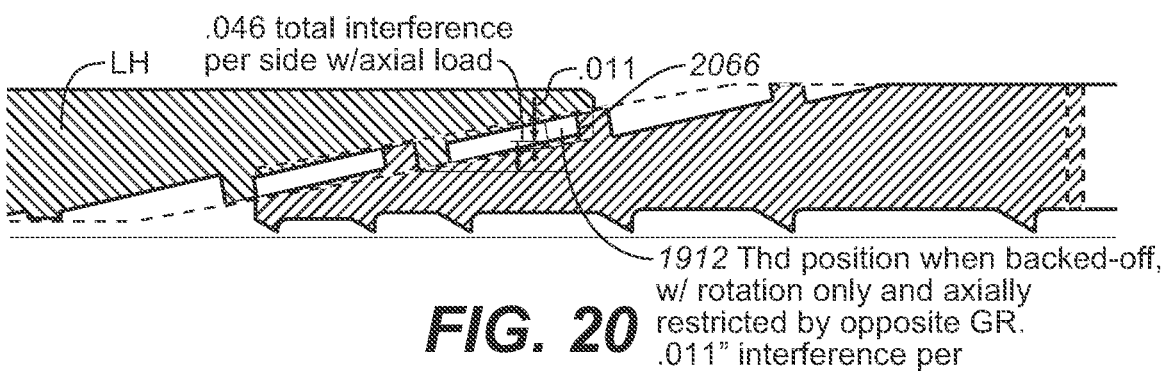
FIG. 20 is a cross sectional view of grip ring and collar with mismatched tapered threads in a backed up position.
Figure 21:
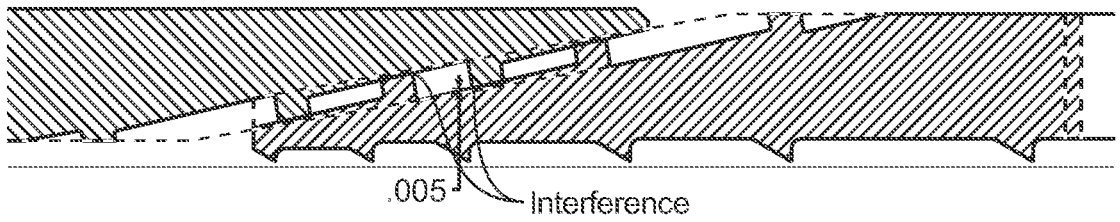
FIG. 21 is a cross sectional view of grip ring and collar with mismatched tapered threads in a slightly backed off position.

The embodiment in FIG. 19-21 present an anti-rotation mechanism that has the desirable characteristic of being simple yet not having an inherently low threshold torque limit in contrast to the other above disclosed methods. This embodiment is compatible with a bidirectional tapered thread tubular gripping device 800 with two grip rings 802 and one collar 804.

In the first embodiment (shown in FIG. 1-3) the wedge angle was depicted as α 314. α 314 was also considered a conical angle that defines: the outer diameter crest surface of the male tapered thread, the inner diameter crest surface of the female tapered thread, the thread root surface of the male thread, and the thread root surface of the female thread.

FIG. 19-21 show an arrangement where the trailing edges of the thread crests of both the male and female threads 1910 and 1912 as well as the leading edges of both the male and female thread roots are defined to coincide with a conical surface with a cone angle of α 1914 (10° in this instance) but where the actual crest surfaces of grip ring male threads 1910 and collar female threads 1912 as well as the root surfaces of the male and female threads 1910 and 1912 are defined by cone angles greater than α 1914 (in this instance α+3° or 13°). Such an arrangement is defined herein as a mismatched tapered thread 1960 and in this example is a 3° mismatched tapered thread 1960.

FIG. 19 is a cross sectional view of grip ring 1902 and collar 1904 with mismatched tapered threads 1960 in a full make-up position. In this view, grip ring 1902 has grip ring male thread 1910 that exist on a 13° ramp 1962 on the outer surface of grip rings 1902 illustrated in accordance with the principles of the present invention described herein. Collar 1904 has a female collar thread 1912, existing on a 13° ramp 1962 on inner surface of collar 1904. Here, each 13° ramp 1962 is formed by a 3° ramp 1964 that is added to an overall 10° ramp 1928. Grip ring male thread 1910 and collar female thread 1912 have a make-up thread flank 1956. Grip ring 1902 also has biased wickers 1916 on grip rings interior surface 1918.

FIG. 19 shows the relative position of parts when the system is installed hand tight. In this state, grip rings 1902 are pulled toward one another and are initially energized by action of collar's female thread 1912 trailing flank and adjacent surfaces acting against grip ring's male thread 1910 trailing flank and adjacent surfaces, similar to the conventionally tapered thread depicted in FIG. 2 and FIG. 9.

Given the arrangement of a center collar 1904 flanked by grip rings 1902 with biased wickers 1916, recall that grip rings 1902 can skid toward one another, but so long as an interference gripping force is maintained then grip rings 1902 will not move significantly in the outward direction away from one another. Thus, if the system is energized and then torque is applied to collar 1904 and into the mismatched tapered thread 1960 in the opposite direction than that of assembly, then grip rings 1902 will remain in position and collar 1904 will tend to spin in a manner to disengage any make-up thread flanks 1956 that were in contact when assembled hand tight. However, because of the provided 3° ramp 1964 any rotation will immediately cause the interference between the tapered thread crests and thread roots to increase. Such interference will provide a steadily increasing torsional resistance to continued relative rotation. As the grip ring male thread 1910 and collar female thread 1912 travel up the opposing thread root gap 1926 they are effectively acting against a 3° interfering wedge angle.

FIG. 20 is a cross sectional view of grip ring 1902 and collar 1904 with mismatched tapered threads 1960 of FIG. 19 in a backed up position. In this view a final allowed position of the thread 1912 can be seen at the point where secondary shoulder 2066 causes the leading edge of the threads to make contact.

Using the previous example of a 3.3 TPI thread pitch and accounting for the thickness of the threads, this view will be reached at a rotation of about ⅔ of a revolution and coincides with a reactive radial interference between collar 1904 and grip ring 1902 of about 0.011 inches. This reactive radial interference will significantly translate into additional penetration of biased wicker 1916 into the surface of casing 122 at this stage. Additional rotation is prevented by action of secondary shoulder 2066 of grip ring 1902 which will not be able to be moved in the outward directions unless and until failure of casing 1922 occurs at the point of biased wicker 1916 penetration.

FIG. 21 is a cross sectional view of grip ring 1902 and collar 1904 with mismatched tapered threads of FIGS. 19 and 20 in a slightly backed off position.

In this view the system has been backed off by about ⅓ of a revolution, and radial interference is visible. Grip ring male thread 1910 can be seen to have an interference with the thread root of collar 1904, and female collar thread 1912 can be seen to have an interference with the thread root of grip ring 1902. In this embodiment, the radial interference is approximately 0.005 inches.

In addition to prevention rotation at the threaded interfaces between grip rings 1902 and collar 1904, it can be desirable to improve the torsional resistance to the spinning of grip rings 1902 against casing 1922 such that the torsional resistance is of a higher value than the static break out friction between any of the external components and the surfaces of the open hole in order to ensure that biased wickers 1916 are not subject to wear resulting from their rotation on the surface of casing 1922. In one embodiment, improved torsional resistance is achieved by incorporating longitudinal mill cuts (not illustrated) or other discontinuities at various points along biased wicker's 1916 sharp corner which would result in an edge penetrating casing 1922 at such points of biased wicker 1916.

FIG. 22 is a cross sectional view of bidirectional tapered thread tubular gripping device 2200 with two grip rings 2202, one collar 2204, and mismatched tapered threads 2260 under left hand rotation 2268 of collar 2204 illustrated in accordance with the principles of the present invention described herein. In this embodiment the mismatched tapered threads 2260 are 3° mismatched tapered threads 2260. Due to the left hand rotation 2268 of collar 2204 radial loads 2274 are transferred to grip rings 2202. Due to radial loads 2274 and 3° mismatched tapered threads 2260, there is increased interference between grip rings 2202 and collar 2204. An outward grip ring load 2276 also results from the left hand rotation 2268 of collar 2204 which loads against biased wickers 2216.

FIG. 23 is a cross sectional view of bidirectional tapered thread tubular gripping device 2200 with two grip rings 2202, one collar 2204, and mismatched tapered threads 2260 under a bottom axial load 2388 illustrated in accordance with the principles of the present invention described herein. In this embodiment, bottom axial load 2388 is applied to lower grip ring 2238, and is transferred through lower grip ring 2238 to collar 2204 and upper grip ring 2236, with frictional losses to casing 2222. Any axial movement of lower grip ring 2238 towards upper grip ring 2236 will be retained by biased wickers 2216.

FIG. 24 is a cross sectional view of bidirectional tapered thread tubular gripping device 2200 with two grip rings 2202, one collar 2204, and mismatched tapered threads 2260 under a bottom axial load 2388 with friction forces visible illustrated in accordance with the principles of the present invention described herein. In this view, there is a centralizer 2480 next to the lower grip ring 2238, an outer casing inner surface 2482 (shown in FIG. 25), and the surface of casing 2222.

In this view centralizer 2480 is shown to experience left hand rotation 2470 as a result of a spring load friction against outer casing inner surface 2482. The rotation of centralizer 2480 causes bottom axial load 2388 to occur on lower grip ring 2238, and is transferred through lower grip ring 2238 to collar 2204 and upper grip ring 2236, with frictional losses to casing 2222. Any axial movement of lower grip ring 2238 towards upper grip ring 2236 will be retained by biased wickers 2216. Grip rings 2202, collar 2204, and casing 2222 all also experience a reactive right hand rotation 2472 from the left hand rotation of centralizer 2470. Collar 2204 also experiences a side load 2478 acting against outer casing inner surface 2482.

FIG. 25 is a cross sectional view of bidirectional tapered thread tubular gripping device 2200 with two grip rings 2202, one collar 2204, and mismatched tapered threads 2260 under a bottom axial load 2388 within a wellbore from FIG. 24. In this view casing 2222 and outer casing 2584 are fully visible.

FIG. 26 is a cross sectional view of bidirectional tapered thread tubular gripping device 2200 with two grip rings 2202, one collar 2204, and mismatched tapered threads 2260 under a top axial load 2686 illustrated in accordance with the principles of the present invention described herein. In this embodiment, there is a centralizer 2480 next to the upper grip ring 2236, an outer casing inner surface 2482, and the surface of casing 2222.

In this view centralizer 2480 is shown to experience left hand rotation 2470 as a result of a spring load friction against outer casing inner surface 2482. The rotation of centralizer 2480 causes top axial load 2686 to occur on upper grip ring 2236, and is transferred through upper grip ring 2236 to collar 2204 and lower grip ring 2238, with frictional losses to casing 2222. Any axial movement of upper grip ring 2236 towards lower grip ring 2238 will be retained by biased wickers 2216. Grip rings 2202, collar 2204, and casing 2222 all also experience a reactive right hand rotation 2472 from the left hand rotation 2470 of centralizer 2480. Collar 2204 also experiences a side load 2478 acting against outer casing inner surface 2482.

What is claimed is:

1. A self-tightening tubular gripping device comprising:
A first grip ring of c-ring shape having:
an interior surface, an outer surface, a make-up surface on one end, a set of wickers, male threads, and an aperture, wherein said make-up surface is an incline on said outer surface, and said male threads are on said make-up surface, wherein said male threads are hardened box threads, and the thread roots of said male threads have an additional taper between each thread, said wickers are on said interior surface, and said aperture extends from said outer surface to said interior surface;
A second grip ring of c-ring shape having:
an interior surface, an outer surface, a make-up surface on one end, a set of wickers, male threads, and an aperture, wherein said make-up surface is an incline on said outer surface, and said male threads are on said make-up surface, wherein said male threads are hardened box threads, and the thread roots of said male threads have an additional taper between each thread, said wickers are on said interior surface, and said aperture extends from said outer surface to said interior surface;
A collar of a cylindrical shape having:
an interior surface, an outer surface, a make-up surface on each end, female threads, and an aperture, wherein said make-up surface is an incline on said interior surface, and said female threads are on each of said make-up surface, wherein said female threads are hardened box threads, and the thread roots of said female threads have an additional taper between each thread, and said aperture extends from said outer surface to said interior surface, said collar is adapted to mate with said first and second grip ring at said make-up surfaces;

said male threads and female threads are spaced apart to facilitate axial movement.

2. The self-tightening tubular gripping device of claim 1 wherein said male threads and said female threads are of a length to where they interfere with the thread roots of the opposing piece.

3. The self-tightening tubular gripping device of claim 1 wherein said male threads and said female threads are tapered threads.

4. The self-tightening tubular gripping device of claim 1 wherein said male threads and female threads are spaced apart to facilitate limited axial movement between said collar and said first and second grip ring.

5. The self-tightening tubular gripping device of claim 1 wherein said aperture is compatible with tools.

6. The self-tightening tubular gripping device of claim 1 wherein said first and second grip ring and said collar is assembled by hand.

7. The self-tightening tubular gripping device of claim 1 wherein said wickers are biased to have a preferred direction of movement.

8. The self-tightening tubular gripping device of claim 1 wherein wickers have longitudinal cuts.

9. The self-tightening tubular gripping device of claim 1 wherein said self-tightening tubular gripping device is bi-directional.

10. A self-tightening tapered thread tubular gripping device comprising:

A first grip ring of c-ring shape having:
an interior surface, an outer surface, a make-up surface on one end, a set of biased wickers, male tapered threads, and an aperture, wherein said make-up surface is a incline on said outer surface, and said male tapered threads are on said make-up surface, wherein said biased wickers are on said interior surface, and said aperture extends from said outer surface to said interior surface; a self-tightening aspect where said male tapered threads are hardened box threads, and the thread roots of said male tapered threads have an additional taper between each thread;

A second grip ring of c-ring shape having:
an interior surface, an outer surface, a make-up surface on one end, a set of biased wickers, male tapered threads, and an aperture, wherein said make-up surface is a incline on said outer surface, and said male tapered threads are on said make-up surface, wherein said biased wickers are on said interior surface, and said aperture extends from said outer surface to said interior surface;

a self-tightening aspect where said male tapered threads are hardened box threads, and the thread roots of said male tapered threads have an additional taper between each thread;

A collar of a cylindrical shape having:
an interior surface, an outer surface, a make-up surface on each end, female tapered threads, and an aperture, wherein said make-up surface is an incline on said interior surface, and said female tapered threads are on each of said make-up surface, and said aperture extends from said outer surface to said interior surface, said collar is adapted to mate with said first and second grip ring at said make-up surfaces;

a self-tightening aspect where said female tapered threads are hardened box threads, and the thread roots of said female tapered threads have an additional taper between each thread;

said male tapered threads and female tapered threads are spaced apart to facilitate limited axial movement.

11. The self-tightening tapered thread tubular gripping device of claim 10 wherein said male tapered threads and said female tapered threads are of a length to where they interfere with the thread roots of the opposing piece.

12. The self-tightening tapered thread tubular gripping device of claim 10 wherein said male tapered threads and female tapered threads are spaced apart to facilitate limited axial movement between said collar and said first and second grip ring.

13. The self-tightening tapered thread tubular gripping device of claim 10 wherein said aperture is compatible with tools.

14. The self-tightening tapered thread tubular gripping device of claim 10 wherein said first and second grip ring and said collar is assembled by hand.

15. The self-tightening tapered thread tubular gripping device of claim 10 wherein wickers have longitudinal cuts.

16. The self-tightening tapered thread tubular gripping device of claim 10 wherein said self-tightening tubular gripping device is bi-directional.

17. A self-tightening bidirectional tapered thread tubular gripping device configured to go around a casing string and adjacent to a stop collar comprising:

A first grip ring of c-ring shape having:
an interior surface, an outer surface, a make-up surface on one end, a set of biased wickers, male tapered threads, and an aperture, wherein said make-up surface is a wedge shape of a ten degree incline on said outer surface, and said male tapered threads are on said make-up surface, wherein said biased wickers are on said interior surface and have a preferred direction of movement, and said aperture extends from said outer surface to said interior surface;
a self-tightening aspect where said male tapered threads are carburized box threads such that said male tapered threads extend into a mating collar, and the thread roots of said male tapered threads have an additional three degree taper between each crest;

A second grip ring of c-ring shape having:
an interior surface, an outer surface, a make-up surface, a set of biased wickers, male tapered threads, and an aperture, wherein said makeup surface is a wedge shape of a ten degree incline on said outer surface, and said male tapered threads are on said make-up surface, wherein said biased wickers are on said interior surface and have a preferred direction of movement, and said aperture extends from said outer surface to said interior surface;
a self-tightening aspect where said male tapered threads are carburized box threads such that said male tapered threads extend into a mating collar, and the thread roots of said male tapered threads have an additional three degree taper between each thread;

A collar of a cylindrical shape having:
an interior surface, an outer surface, a make-up surface on each end, female tapered threads, and an aperture, wherein said make-up surface is a wedge shape of a ten degree incline on said interior surface, and said female tapered threads are on each of said make-up surface, and said aperture extends from said outer surface to said interior surface, said collar is adapted to mate with said first and second grip ring at said make-up surfaces;

a self-tightening aspect where said female tapered threads are carburized box threads such that said female tapered threads extend into a mating grip ring, and the thread roots of said female tapered threads have an additional three degree taper between each thread;

said male tapered threads and female tapered threads are spaced apart to facilitate limited axial movement between said collar and said first and second grip ring.

18. The self-tightening bidirectional tapered thread tubular gripping device of claim 17 wherein said aperture is compatible with tools.

19. The self-tightening bidirectional tapered thread tubular gripping device of claim 17 wherein said first and second grip ring and said collar is assembled by hand.

20. The self-tightening bidirectional tapered thread tubular gripping device of claim 17 wherein wickers have longitudinal cuts.

\* \* \* \* \*